US007377117B2

(12) United States Patent
Riggi, Jr. et al.

(10) Patent No.: US 7,377,117 B2
(45) Date of Patent: May 27, 2008

(54) TRANSITION PIECE FOR GAS TURBINE

(75) Inventors: Vincent T. Riggi, Jr., Saratoga Springs, NY (US); Ronald A. Riggi, Saratoga Springs, NY (US); Warren Peck, Saratoga Springs, NY (US); Martin Harr, Saratoga Springs, NY (US)

(73) Assignee: Turbine Services, Ltd., Saratoga Springs, NY (US)

( * ) Notice: Subject to any disclaimer, the term of this patent is extended or adjusted under 35 U.S.C. 154(b) by 505 days.

(21) Appl. No.: 11/200,382

(22) Filed: Aug. 9, 2005

(65) Prior Publication Data

US 2007/0033941 A1 Feb. 15, 2007

(51) Int. Cl.
*F02C 7/00* (2006.01)
*F23R 3/60* (2006.01)

(52) U.S. Cl. .......................................... 60/796; 60/752

(58) Field of Classification Search ............... 60/39.37, 60/722, 752, 796, 798, 800
See application file for complete search history.

(56) References Cited

U.S. PATENT DOCUMENTS

| | | | |
|---|---|---|---|
| 4,297,843 A | 11/1981 | Sato et al. | |
| 4,422,288 A | 12/1983 | Steber | |
| 5,414,999 A | 5/1995 | Barnes | |
| 5,761,898 A | 6/1998 | Barnes et al. | |
| 6,442,946 B1 * | 9/2002 | Kraft et al. | 60/796 |
| 6,619,915 B1 | 9/2003 | Jorgensen | |
| 6,662,567 B1 | 12/2003 | Jorgensen | |
| 6,675,584 B1 | 1/2004 | Hollis et al. | |
| 6,769,257 B2 | 8/2004 | Kondo et al. | |
| 2004/0031271 A1 | 2/2004 | Jorgensen | |
| 2005/0047907 A1 | 3/2005 | Nordlund | |

FOREIGN PATENT DOCUMENTS

EP 0 718 468 A1 6/1996

OTHER PUBLICATIONS

European Search Report dated May 8, 2006, European Patent Application No. 05077569.1, which corresponds to the subject application.

* cited by examiner

*Primary Examiner*—L. J. Caseregola
(74) *Attorney, Agent, or Firm*—Wood, Phillips, Katz, Clark & Mortimer

(57) ABSTRACT

As used to connect a combustor of a gas turbine to a stage of the gas turbine, a transition piece has a generally tubular body, an inlet to receive hot gases from the combustor, and an outlet to discharge the gases. The transition piece has a frame, which surrounds the outlet, and two mounting connectors, which are spaced from each other and which extend from the frame, away from the outlet. The mounting connectors are welded to a pedestal, which is formed unitarily with the frame so as to extend partially but not completely around the outlet.

6 Claims, 2 Drawing Sheets

TRANSITION PIECE FOR GAS TURBINE

TECHNICAL FIELD OF THE INVENTION

This invention pertains to a transition piece of a type used in a gas turbine to connect a combustor to a stage.

BACKGROUND OF THE INVENTION

A transition piece of the type noted above is exemplified in U.S. Pat. No. 5,414,999, the disclosure of which is incorporated by reference herein. This invention addresses perceived shortcomings in the transition piece disclosed therein. As disclosed therein, the transition piece has an inlet to receive hot gases and an outlet to discharge the gases. Moreover, the transition piece has a frame, which frames the outlet and which has three ribs surrounding and extending away from the outlet. The frame has a longer, arcuate portion, a shorter, arcuate portion, two lateral, radial portions, which are shorter than the shorter, arcuate portion, and four rounded, corner portions joining the arcuate and radial portions. Moreover, a mounting connector extends from a middle one of those ribs, away from the outlet.

SUMMARY OF THE INVENTION

Broadly, this invention provides a transition piece of the type noted above, wherein the mounting connector does not extend from such a rib but, rather, wherein the mounting connector is mounted to a pedestal, which is mounted to the frame so as to extend partially but not completely around the outlet. Preferably, the mounting connector and the pedestal are unitary and are welded to the frame.

Preferably, rather than one mounting connector, the transition piece has two mounting connectors, each being mounted to the pedestal. Preferably, moreover, the mounting connectors and the pedestal mounting the mounting connectors to the frame are unitary and are welded to the frame.

Preferably, if the frame has a longer, arcuate portion, a shorter, arcuate portion, two lateral, radial portions, which are shorter than the shorter, arcuate portion, and four rounded, corner portions joining the arcuate and radial portions, the pedestal is mounted to the longer, arcuate portion of the frame and extends completely along the larger, arcuate portion, completely along each of the rounded, corner portions adjoined to the longer, arcuate portion, and substantially less than halfway along each of the lateral, radial portions where adjoined to one of the rounded, corner portions adjoined to the longer, arcuate portion, but the pedestal does not extend further along either of the lateral, radial portions and does not extend along any part of the shorter, arcuate portion.

Optionally, the frame has plural ribs surrounding and extending away from the outlet. However, the mounting connector, if one mounting connector is provided, does not extend from any of those ribs. Moreover, neither mounting connector, if two mounting connector are provided, extends from any of those ribs.

DETAILED DESCRIPTION OF THE ILLUSTRATED EMBODIMENT

Figure 1:
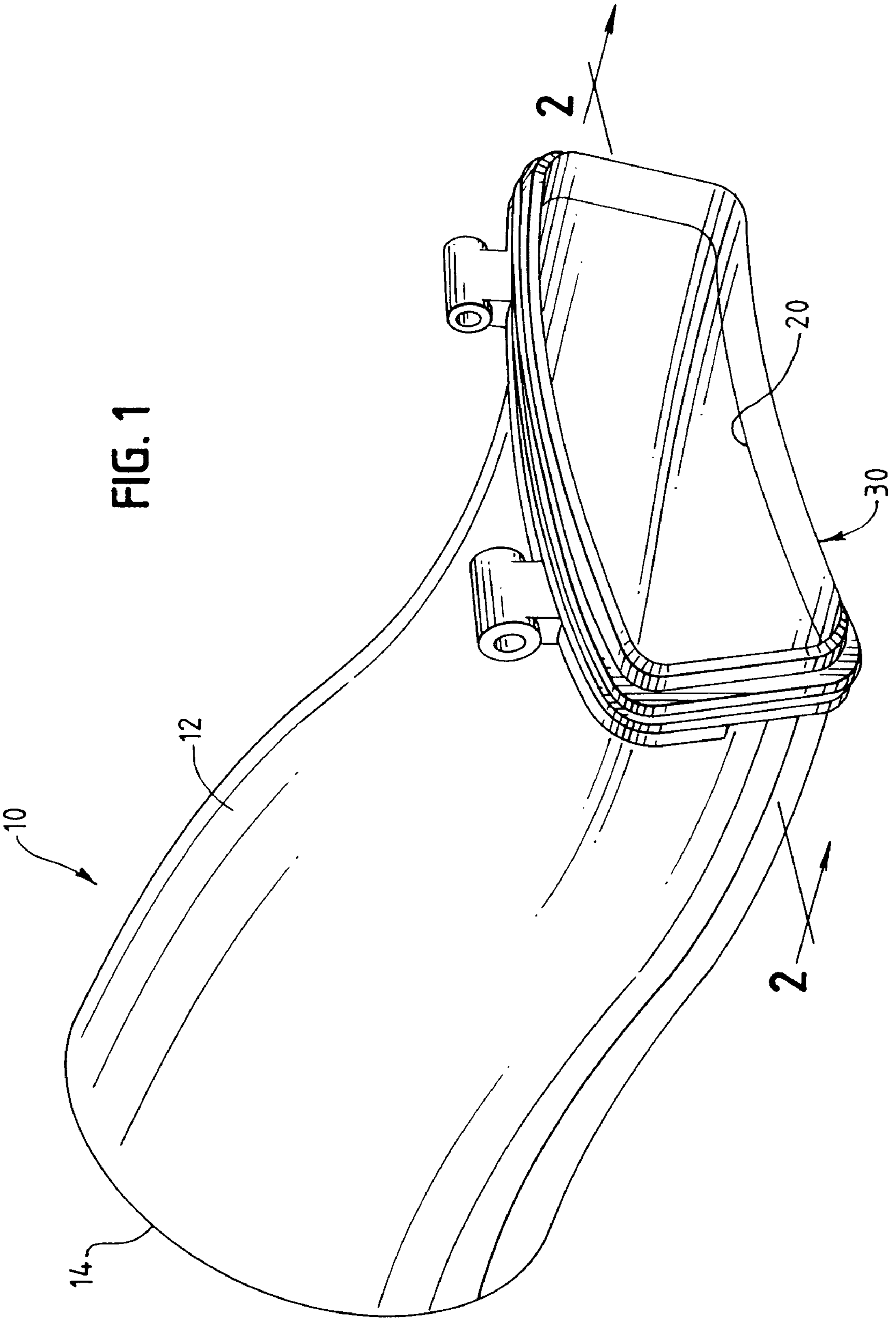
FIG. 1 is a perspective view of a transition piece embodying this invention, as seen from a vantage looking and one side of the transition piece and at its outlet.

As illustrated in FIG. 1, a transition piece 10 of the type noted above has a generally tubular body 12, an inlet 14, which conforms to a circular annulus, to receive hot gases from an associated combustor of a gas turbine, and an outlet 20 to discharge the gases to an associated stage of the gas turbine. The transition piece 10 has a frame 30, which is welded to the generally tubular body 12 of the transition piece 10, via a weld 32, so as to surround the outlet 20 entirely. Framing the outlet 20, the frame 30 has a larger, arcuate portion 42, a smaller, arcuate portion 44, two lateral, radial portions 46, which are shorter than the smaller, radial portion 44, and four rounded, corner portions 48 joining the arcuate and radial portions. The frame 30 has two ribs 50, which are formed unitarily with the frame 30 so as to extend along the arcuate, lateral, and corner portions of the frame 30, whereby to surround the outlet 20 entirely. Between the ribs 50, a groove 52 is defined, which likewise surrounds the outlet 20 entirely. Herein, the term "arcuate" and the term "radial" are referred to an imaginary centerline of an arcuate array of transition pieces, which are exemplified by the transition piece 10, in the gas turbine.

Figure 2:
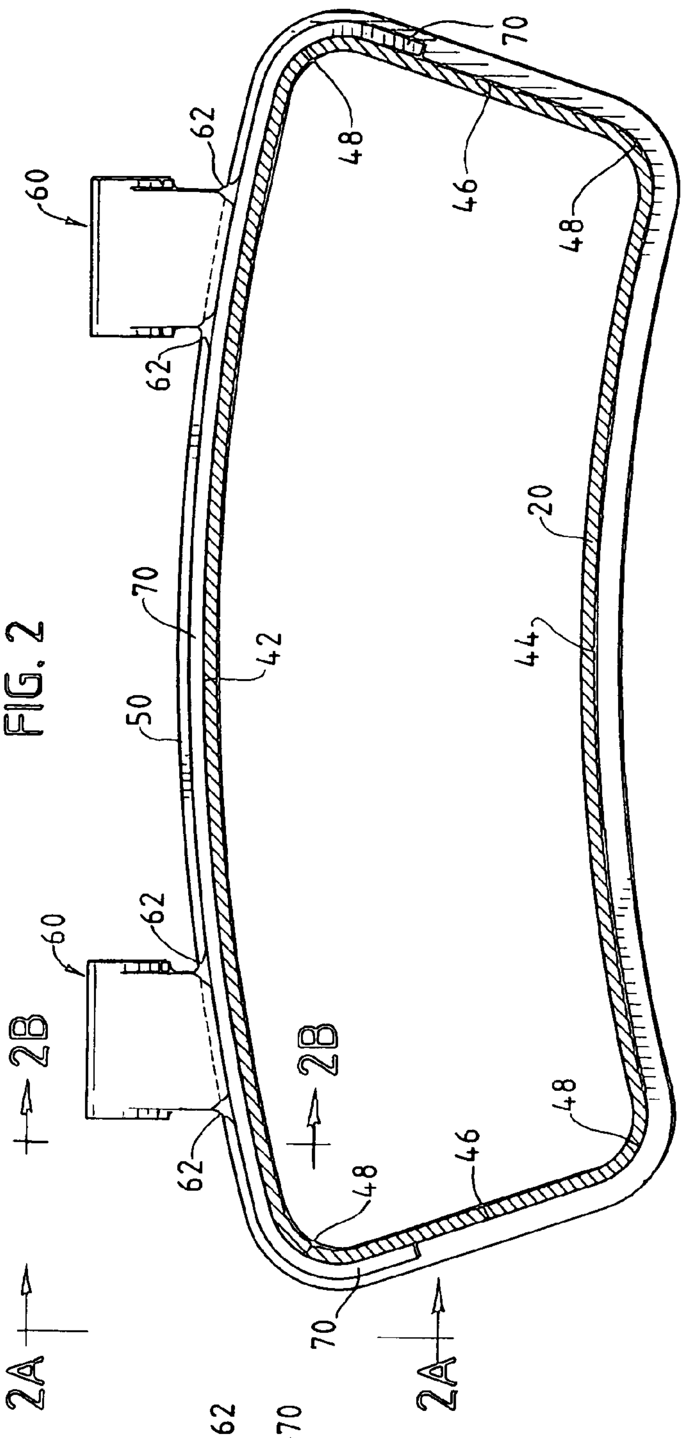
FIG. 2 is a sectional view, which is taken along line 2-2 in FIG. 1, in a direction indicated by arrows.
Figure 2A:
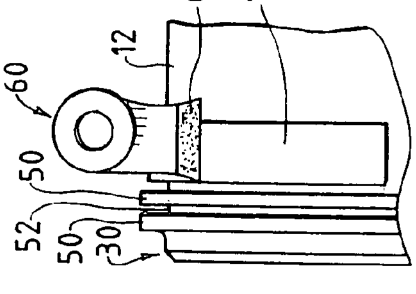
FIG. 2A is a fragmentary detail, which is taken along line 2A-2A in FIG. 2, in a direction indicated by arrows.

As illustrated in the several views of the drawings, the transition piece 10 has two mounting connectors 60, which are spaced from each other, which are mounted to the larger, arcuate portion 42 of the frame 30, in a manner described below, so as to extend away from the outlet 20, and which are used to connect the transition piece 10, via a bolt, to a mounting connector of the associated stage of the gas turbine. A generally similar bolting arrangement is illustrated in FIGS. 1 and 2 ("PRIOR ART") of U.S. Pat. No. 5,414,999, supra, and is described in column 1, lines 15 through 40, thereof.

Figure 2B:
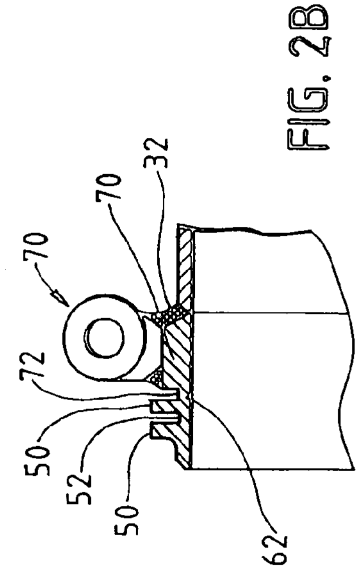
FIG. 2B is a fragmentary, sectional view, which is taken along line 2B-2B in FIG. 2, in a direction indicated by arrows.

The transition piece 10 has a pedestal 70, which is formed unitarily with the frame 30 and which, as illustrated in FIG. 2B-2B, in cross-section is several times wider when compared to either of the ribs 50 in cross-section. Between the pedestal 70 and the nearer rib 50, a groove 72 is defined, which relative to the ribs 50 is as deep as the groove 52 between the ribs 50. The pedestal 70 extends completely along the larger, arcuate portion 42, completely along each of the rounded, corner portions 48 adjoined to the longer, arcuate portion 42, and substantially less than halfway along each of the lateral, radial portions 46 where adjoined to one of the rounded, corner portions 48 adjoined to the longer, arcuate portion 32. The pedestal 70 does not extend further along either of the lateral, radial portions 46 and does not extend along any part of the shorter, arcuate portion 44. Thus, the pedestal 70 extends partially but not completely around the outlet 20. Each mounting connector 60 is mounted to the pedestal 70, via the weld 32, which is used, as described above, to weld the frame 30 to the generally tubular body of the transition piece 10 and via other welds 62, which merge with the weld 32 and which extend along the inlet and lateral sides of said mounting connector 60 where said mounting connector 60 meets the pedestal 70.

Being mounted to the frame 30 via the pedestal 70, which in cross-section is several times wider when compared to either of the ribs 50 in cross-section, each mounting connector 60 is mounted to the frame 30 more rigidly, as compared to a mounting connector extending from such a rib in a manner disclosed in U.S. Pat. No. 5,414,999. Moreover, where the mounting connectors 60 are mounted, the pedestal 70, which extends continuously between the mounting connectors 60 and which extends further beyond the mounting connectors 60, reinforces the frame 30.

The invention claimed is:

1. In a transition piece of a type used to connect a combustor of a gas turbine to a stage of the gas turbine, the transition piece having a generally tubular body, an inlet to receive hot gases from the combustor, and an outlet to discharge the gases, the transition piece having a frame, which surrounds the outlet, the transition piece having a mounting connector, which extends from the frame, away from the outlet, wherein the frame has a longer, arcuate portion, a shorter, arcuate portion, two lateral, radial portions, which are shorter than the shorter, arcuate portion, and four rounded, corner portions joining the arcuate and radial portions, an improvement wherein the mounting connector is mounted to a pedestal, which projects from the longer, arcuate portion of the frame, which extends completely along the larger, arcuate portion, completely along each of the rounded, corner portions adjoined to the longer, arcuate portion, and substantially less than halfway along each of the lateral, radial portions where adjoined to one of the rounded, corner portions adjoined to the longer, arcuate portion, but which does not extend further along either of the lateral, radial portions and which does not extend along any part of the shorter, arcuate portion.

2. The improvement of claim 1, wherein the mounting connector is one of two mounting connectors, which are mounted to the pedestal and which are spaced from each other where mounted to the pedestal.

3. The improvement of claim 1, wherein the pedestal is formed unitarily with the frame, which is welded to the generally tubular body of the transition piece, and wherein the mounting connector is mounted to the pedestal by being welded to the pedestal.

4. The improvement of claim 1, wherein the pedestal is formed unitarily with the frame, which is welded to the generally tubular body of the transition piece, and wherein the mounting connector is mounted to the pedestal by being welded to the pedestal where the frame is welded to the generally tubular body of the transition piece.

5. The improvement of claim 2, wherein the pedestal is formed unitarily with the frame, which is welded to the generally tubular body of the transition piece, and wherein the mounting connectors are mounted to the pedestal by being welded to the pedestal.

6. The improvement of claim 2, wherein the pedestal is formed unitarily with the frame, which is welded to the generally tubular body of the transition piece, and wherein the mounting connector is welded to the pedestal where the frame is welded to the generally tubular body of the transition piece.

* * * * *